United States Patent [19]

Isobe et al.

[11] Patent Number: 5,108,207
[45] Date of Patent: Apr. 28, 1992

[54] PRINTER WITH VARIABLE MEMORY SIZE

[75] Inventors: Yasuhiko Isobe, Kasuga; Takunori Tsuji; Yoshitsugu Hayashi, both of Fukuoka, all of Japan

[73] Assignee: Matsushita Electric Industrial Co., Ltd., Osaka, Japan

[21] Appl. No.: 379,887

[22] Filed: Jul. 14, 1989

[30] Foreign Application Priority Data

Jul. 20, 1988 [JP] Japan .................. 63-180911
Aug. 17, 1988 [JP] Japan .................. 63-204310

[51] Int. Cl.5 .................................. B41J 5/30
[52] U.S. Cl. ....................... 400/70; 400/61; 395/115
[58] Field of Search .......... 400/121, 61, 70; 364/519, 523; 395/115

[56] References Cited

U.S. PATENT DOCUMENTS 4,325,063  4/1982  Herman ..................... 340/790
4,866,671  9/1989  Yokoyama ................. 400/121

FOREIGN PATENT DOCUMENTS 135938   10/1980  Japan ....................... 400/279
61-54528  3/1986  Japan ........................ 400/61
61-54769  3/1986  Japan ........................ 400/61
1004472   5/1986  Japan ....................... 400/279
61-117972 6/1986  Japan ........................ 400/61

Primary Examiner—David A. Wiecking
Assistant Examiner—Steven S. Kelley
Attorney, Agent, or Firm—Stevens, Davis, Miller & Mosher

[57] ABSTRACT

A printer used as an output unit for a personal computer or the like is characterized by having a memory unit including a first memory area for storing input data and a second memory area for storing image data obtained by developing the input data, the first memory area and the second memory area being arranged within one and the same memory space to form the memory unit, and by having an area control unit for changing a proportion of the capacity of the second memory area within the memory unit to alter the relative proportions of the first memory area and the second memory area in the memory space forming the memory unit. A print unit included in the printer fetches the image data from the second memory area and performs printing in accordance with the fetched image data.

11 Claims, 5 Drawing Sheets

PRINTER WITH VARIABLE MEMORY SIZE

BACKGROUND OF THE INVENTION

1. FIELD OF THE INVENTION

This invention relates to a printer utilized as an output unit of a personal computer or the like.

2. DESCRIPTION OF THE RELATED ART

Recently, a high speed and high-grade functions have been required for the printer. Especially, a printer of an electrophotographic type using an array of laser diodes or light emitting diodes (LED's) as a light source has a high printing speed and high sprinting quality and is gaining a remarkably widespread field of utilization. Naturally, a printer operative at high speeds is required to have high capability of processing print data. Print data can be processed in various ways but principally the type of processing may be classified into two kinds.

The two kinds of processing types will now be described with respect to conventional examples in conjunction with the accompanying drawings. FIG. 2 is a block diagram schematically illustrating a conventional printer according to one of the two kinds of processing types which is a page memory type. A printer 1 is divided into a controller unit 1a for processing print data sent from a host computer 2 and a printing unit 1b for printing onto paper. The controller unit 1a comprises a CPU 3 for controlling data processing, a program ROM 4 for storing programs necessary for the operation of the CPU 3, a font ROM 5 for storing font data corresponding to letter codes, an interface 6 for receiving print data from the host computer 2, a page memory 14 for storing image data for one page, a barrel shifter 7 for writing a font in the page memory 14 while shifting the font, and a parallel/serial converter 10 for reading the image data stored in the page memory 14 and converting the read-out data into serial data which is then outputted to the printing unit 1b. The printing unit 1b comprises a printing mechanism 12 and a printing mechanism controller 11 for controlling the operation of the printing mechanism 12.

The operation of the conventional printer of the page memory type having the above-described construction will be described with reference to the process chart shown in FIG. 4. At (a) in FIG. 4, the printer 1 receives letter codes from the host computer 2. The letter codes are assigned in one-to-one correspondence to individual letters, whereby, for example, a letter code 61H is selected to represent an alphabetical lowercase letter "a". The CPU 3 interprets the letter codes, reads corresponding font data from the font ROM 5, and writes the read-out data in the page memory 14. The font data is read out from the font ROM 5 in a byte unit or in a word unit. In order that a font is positioned at desired bit positions on the page memory 14, the readout font data is stored in the page memory 14 via the barrel shifter 7. In this manner, data for one page corresponding directly to images to be printed is prepared in the page memory 14, as shown at (b) in FIG. 4. After completion of preparation of images for one page, the controller unit 1a drives the printing unit 1b, and, at the same time, starts outputting of the print data. The print data is converted from parallel data to serial data at every raster through the parallel/serial converter 10 and the resultant serial data is outputted to the printing mechanism controller 11 to obtain printed results as shown at (c) in FIG. 4.

As is understood from the foregoing, a conventional printer of the page memory type is advantageous in that data corresponding directly to images for one page to be printed can be stored, while, on the other hand, it is disadvantageous in that a very large memory capacity is required. For example, in order to print a letter paper (8.5 inches×11 inches) at the resolution of 300 dots/inch, a memory capacity of about 1 MB (1 mega byte) is required. To eliminate the above disadvantage, a printer of the other type called a video band buffer type (hereinafter simply referred to as VBB type) is used wherein printing is performed using an image development area of 1/n page.

A conventional printer of the VBB type will now be described with reference to the accompanying drawings. FIG. 3 is a block diagram schematically illustrating a conventional printer of the VBB type. A printer 1 is divided into a controller unit 1a' for processing print data sent from a host computer 2 and a printing unit 1b for printing a print paper. The printing unit 1b has the same construction as that of the aforementioned printer of the page memory type. The controller unit 1a' comprises a CPU 3 for controlling data processing, a program ROM 4 for storing programs necessary for the operation of the CPU 3, a font ROM 5 for storing font data corresponding to letter codes, an interface 6 for receiving print data from the host computer 2, a text memory 8 for storing letter codes for one page in the form of a group of texts, a video band buffer (VBB) 9 for storing image data for 1/n page, a barrel shifter 7 for writing a font in the VBB 9 while shifting the font, and a parallel/serial converter 10 for reading image data stored in the VBB 9 and converting the read-out data into serial data which is then outputted to the printing unit 1b.

The operation of the conventional printer of the VBB type having the above-described construction will be described with reference to the process chart shown in FIG. 4. At (a) in FIG. 4, the printer 1 receives letter codes from the host computer 2. The CPU 3 interprets the letter codes and prepares a text including the letter codes and the information added thereto for indicating writing positions at which the letters are to be written in the VBB 9. Thus, a group of texts corresponding to the letter codes for one page are prepared in the text memory 8 as shown at (d) in FIG. 4. After completion of preparation of a group of texts for one page, the CPU 3 interprets the texts starting from a top one and writes a font in the VBB 9. Since the VBB 9 has a memory capacity only for 1/n page, the CPU 3 is initially allowed to interpret the texts only for 1/n page. At the time when images for 1/n page are completed, the CPU 3 drives the printing unit 1b to start printing, as shown at (e) in FIG. 4. Concurrently therewith, the print data is outputted at every raster from the VBB 9 to the parallel/serial converter 10 so as to be converted into serial data which is then outputted to the printing mechanism controller 11. The outputting of print data at every raster causes an empty area to be produced in the VBB 9. Each time an empty area occurs, the CPU 3 writes a font for the next line in the VBB 9. In this manner, outputting from the VBB 9 and writing of a font in the VBB 9 are repeated alternately and printing for one page can be accomplished, thereby obtaining print results as shown at (f) in FIG. 4. Thus, even though the VBB 9 normally has the structure of a ring buffer and has a nominal capacity only of 1/n page, it can be used as having an infinite capacity in terms of a virtual address space.

As is apparent from the foregoing, as compared with a conventional printer of the page memory type, a conventional printer of the VBB type can perform printing by using the VBB of a reduced capacity of 1/n page and the text memory of a small capacity, so that the latter printer is advantageous in reducing the memory capacity to a great extent.

However, with a conventional printer of the above-mentioned VBB type, as the letter data density increases, it takes a long time for the CPU 3 to write data in the VBB 9, and, as a result, a conventional printer of the VBB type is disadvantageous in that the speed of outputting print data from the VBB 9 overtakes the speed of writing data in the VBB 9, which causes an overrun error to occur, thereby making it impossible to perform printing.

SUMMARY OF THE INVENTION

A main object of this invention is to provide a printer of the VBB type capable of suppressing the frequency of occurrence of overrun errors.

Another object of this invention is to provide a printer wherein, even when an overrun error has once occurred, the frequency of subsequent occurrence of overrun errors can be suppressed.

DESCRIPTION OF THE PREFERRED EMBODIMENTS

The invention will now be described by way of example with reference to the accompanying drawings.

Figure 1:
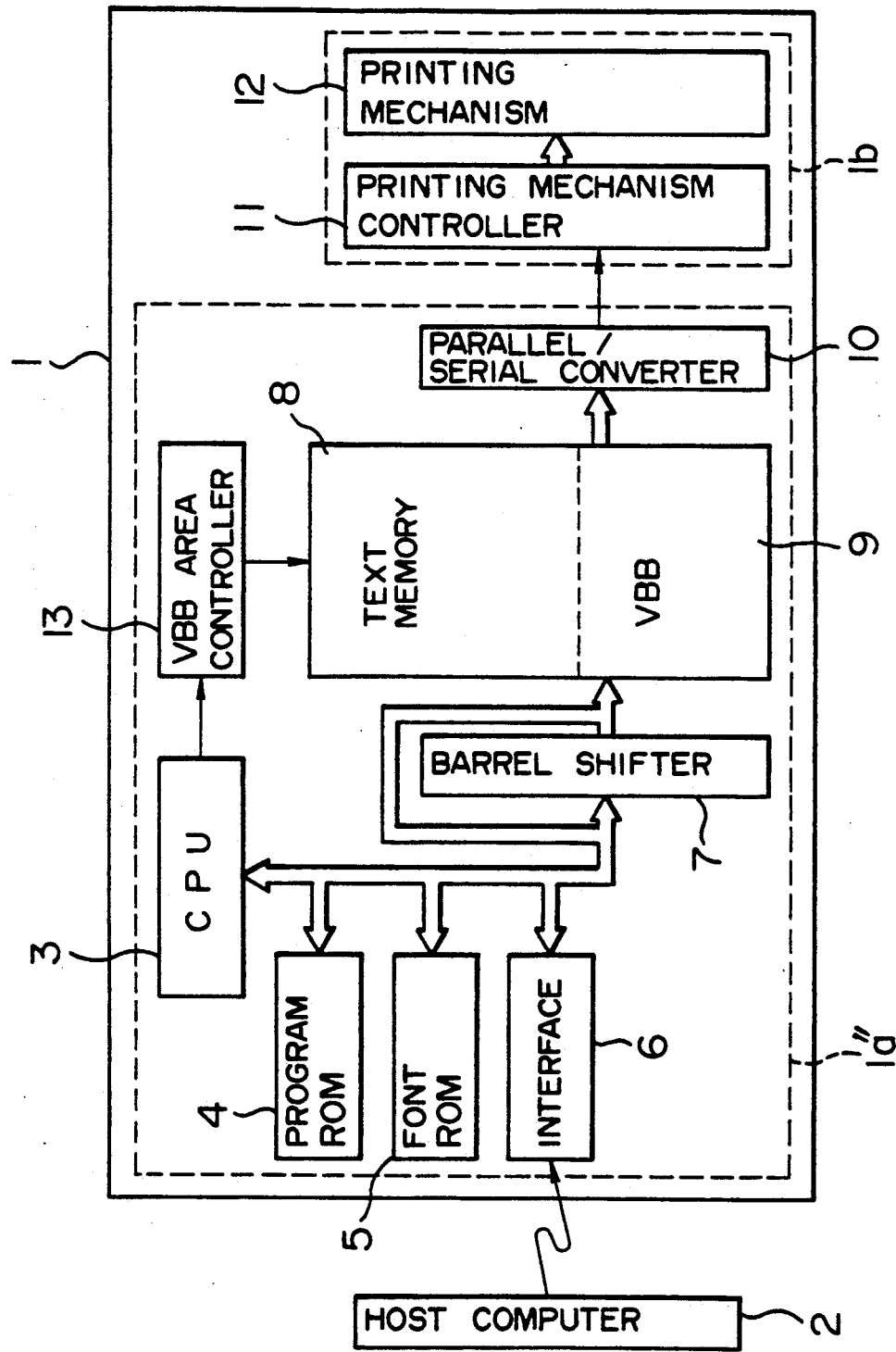
FIG. 1 is a block diagram showing an embodiment of a printer according to this invention.
Figure 2:
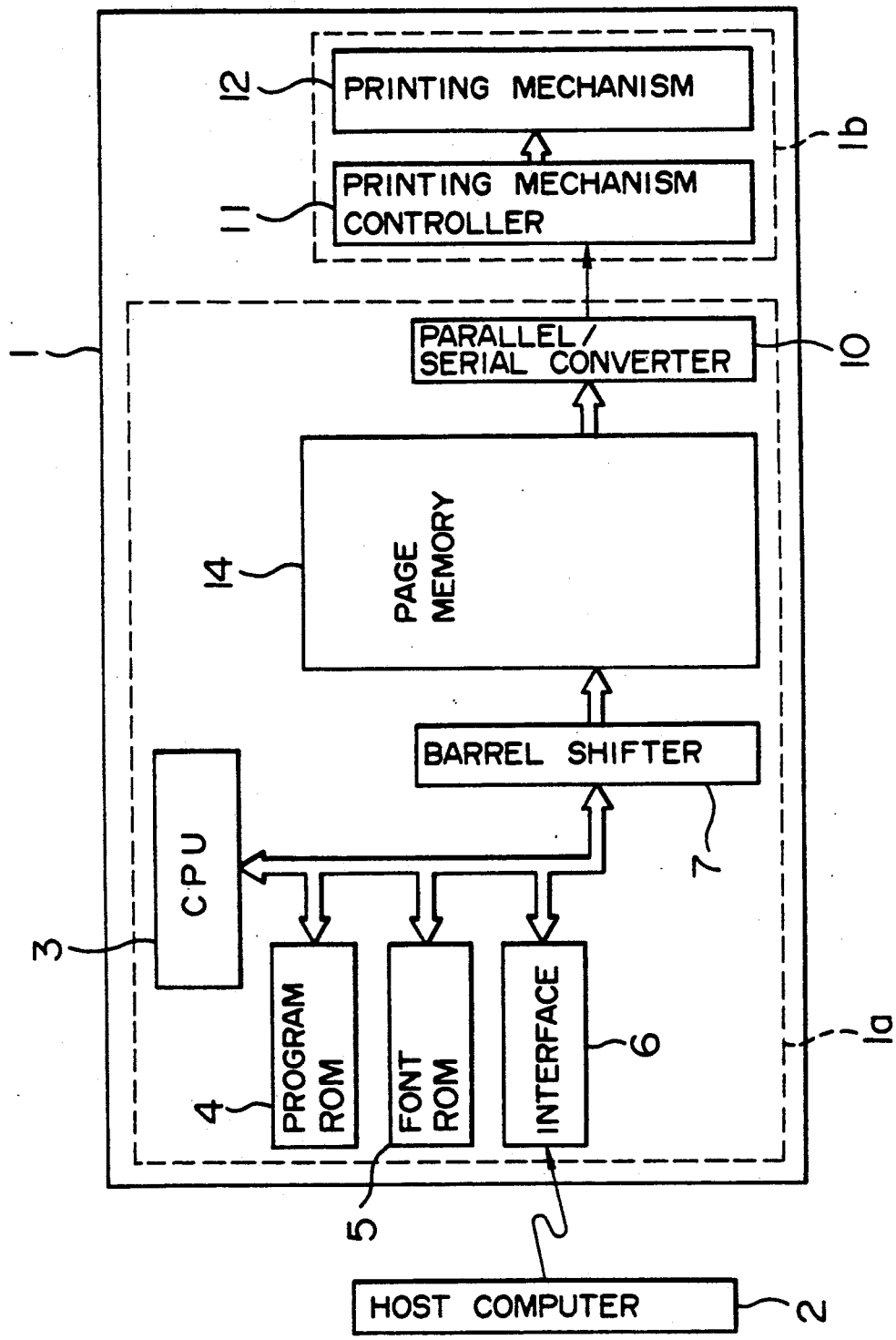
FIG. 2 is a block diagram illustrating a conventional printer of the page memory type.
Figure 3:
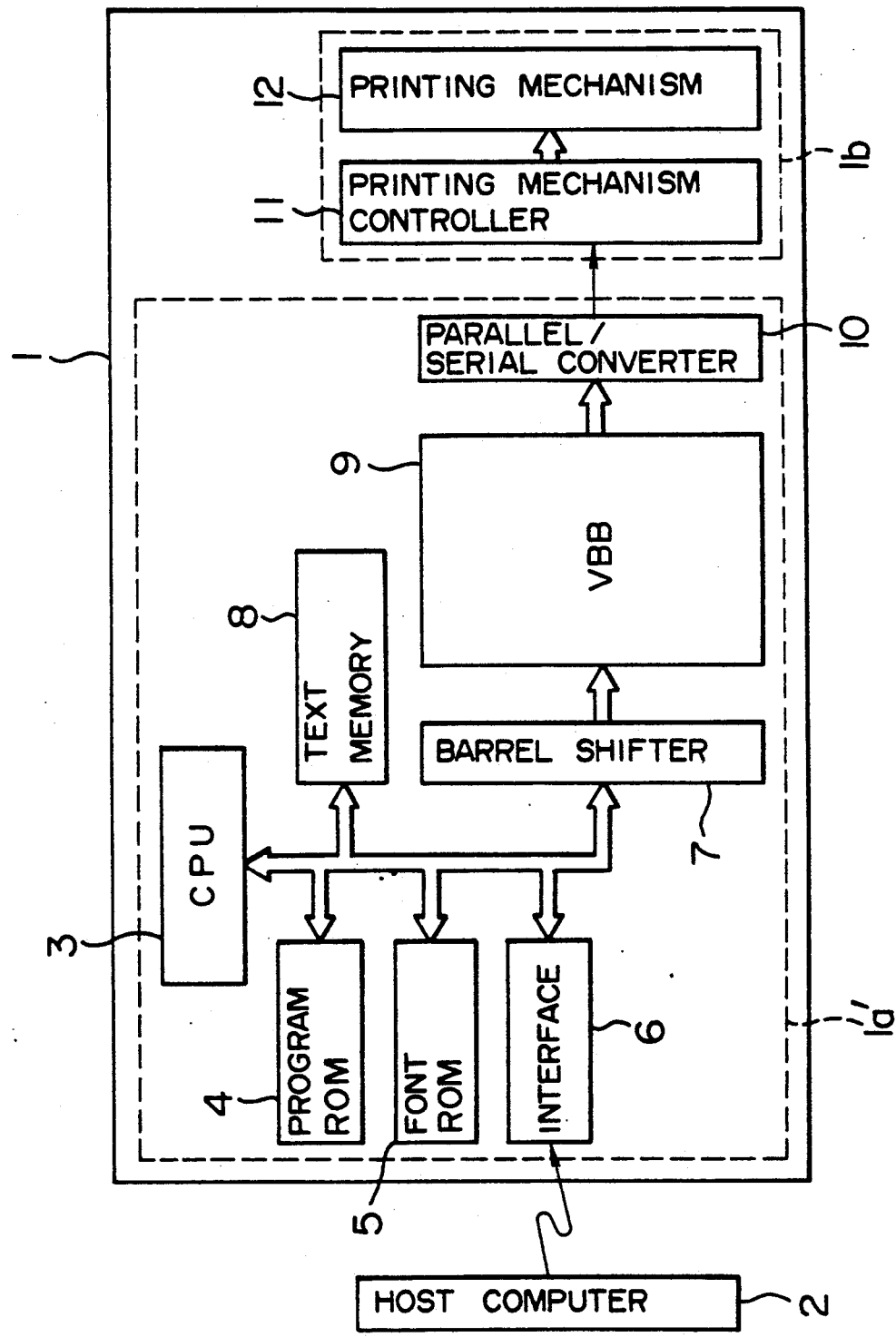
FIG. 3 is a block diagram illustrating a conventional printer of the VBB type.
Figure 4:
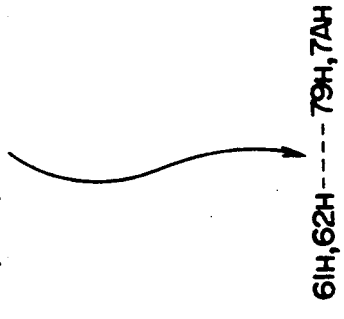
FIG. 4 is a process chart for illustrating processing steps for the conventional printers.
Figure 4:
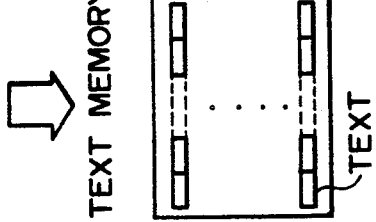

FIG. 1 is a block diagram showing a printer of an embodiment of this invention. In FIG. 1, reference numeral 8 designates a text memory and reference numeral 9 designates a video band buffer (VBB). The text memory 8 and the VBB 9 are arranged contiguously within the same memory space. A VBB area controller 13 is responsive to an instruction from a CPU 3 and operable to increase or decrease the capacity of the VBB 9. A barrel shifter 7 writes a font in the VBB 9 while shifting the font. Only when addresses in the VBB 9, which have been designated by the VBB area controller 13, are accessed, data passes through the barrel shifter 7, while, when addresses in the text memory 8 are accessed, data bypasses the barrel shifter 7 and are written in the text memory 8. The other portions of the printer shown in FIG. 1 are identical in structure with a conventional printer of the VBB type.

Figure 5:
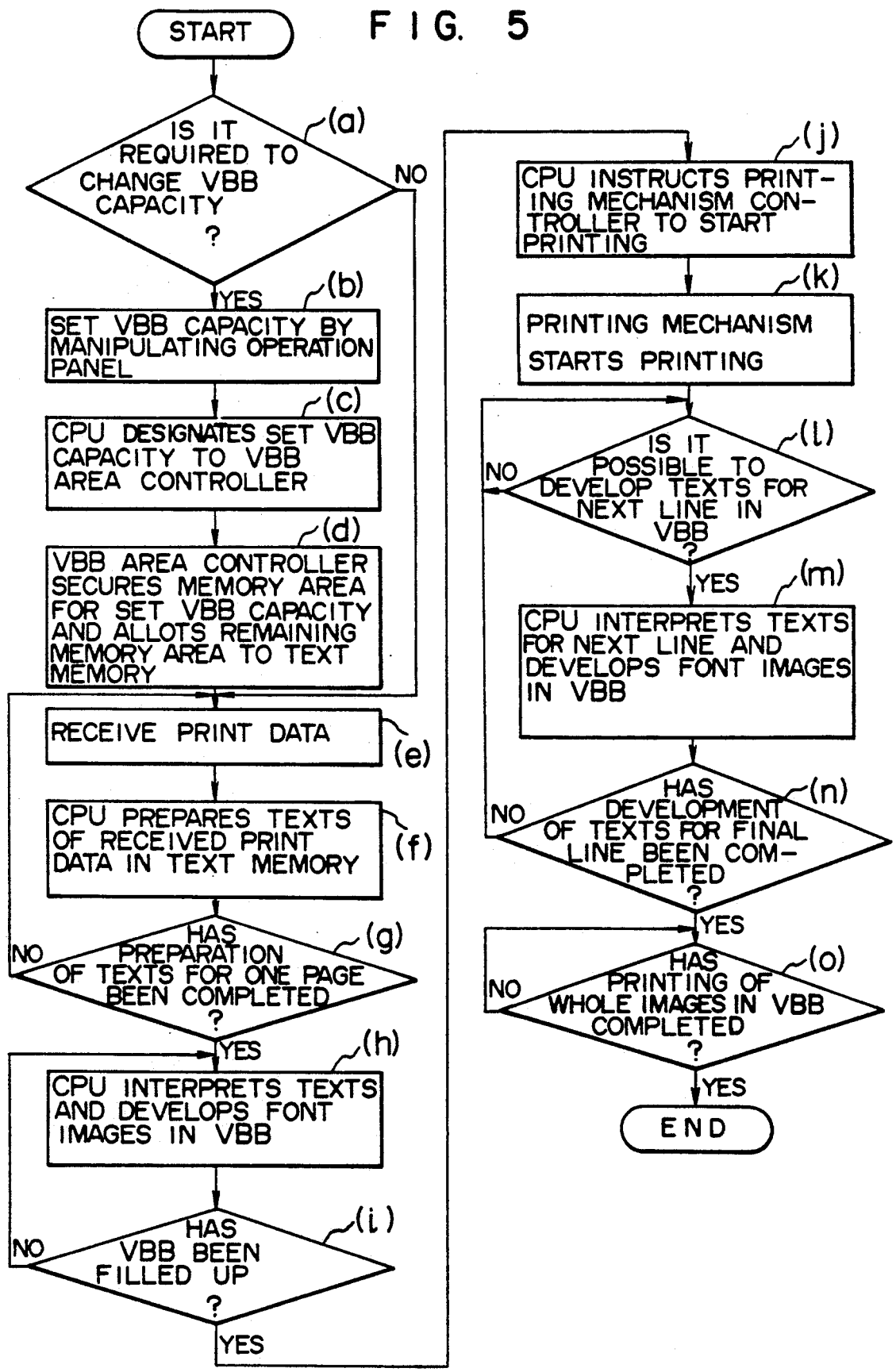
FIG. 5 is a flow chart illustrating the operation of a printer according to this invention.

The operation of the printer of this invention constructed as above will be described below in conjunction with a flow chart shown in FIG. 5, wherein the capacity of the VBB 9 is changed as desired by a user who manipulates the operation panel of the printer. If a user wishes to change the VBB capacity in such a case of printing a page with a high printing density [step (a)], a desired VBB capacity is keyed in from the operation panel to be set thereby [step (b)]. When printing with a high printing density is desired, the operation panel is so manipulated as to increase the VBB capacity. When there is no need for changing the VBB capacity, the current VBB capacity is maintained. When changing the VBB capacity, the CPU 3 designates the set VBB capacity to the VBB area controller 13 [step (c)]. The VBB area controller 13 then secures an area for the designated set VBB capacity and at the same time allots the remaining area to the addresses for the text memory 8 [step (d)]. The interface 6 receives print data (letter codes, etc.) sent from the host computer 2 [step (e)]. The CPU 3 prepares texts for the received data in the text memory 8 [step (f)], and checks whether text for one page have been prepared or not [step (g)]. Then, steps (e) to (g) are repeated until the preparation of texts for one page is completed. As the preparation of texts for one page is completed, the CPU 3 interprets the texts, reads font images from the font ROM 5, and develops the read-out font images in the VBB 9 through the barrel shifter 7 [step (h)]. The CPU 3 checks whether the VBB 9 has been filled up to the set capacity or not [step (i)]. Then, steps (h) and (i) are repeated until the VBB 9 is filled up to the presently set capacity. When the VBB 9 has been filled up to the set capacity, the CPU 3 instructs the printing mechanism controller 11 to start printing [step (j)]. The printing mechanism controller 11 thus instructed controls the printing mechanism 12 to cause it to start printing [step (k)]. As printing is started, the font images developed in the VBB 9 are outputted to the printing mechanism controller 11 at every raster through the parallel/serial converter 10, and thus the outputted font image portion leaves an empty area behind in the VBB 9. The CPU 3 then checks whether the empty area growing in the VBB 9 has increased to be sufficient for developing texts for a next line [step (l)]. When it has become possible to develop texts for a next line in the VBB 9, the CPU 3 again interprets texts and develops font images in the VBB 9 [step (m)]. The CPU 3 checks whether the development of texts for the final line has been completed or not [step (n)]. Then, steps (l) to (n) are repeated until the development of texts for the final line is completed. Subsequent to the completion of development of the whole texts, the CPU 3 checks whether the whole font images have been outputted from the VBB 9 and the printing of the whole font images in the VBB 9 has been completed or not [step (o)]. When the output of step (o) branches to "YES", the printing operation comes to an end.

As described above, the printer of this embodiment permits the VBB capacity to be changed, so that, as compared with a conventional printer of the page memory type, a total memory capacity can be reduced and also a printing time can be reduced, because the development only of the texts corresponding to the set VBB capacity allows the printing operation to be started with no necessity for awaiting the completion of development of texts for one whole page. In addition, as compared with a conventional printer of the VBB type, the printer of this invention can decrease the frequency of occurrence of overrun errors. Thus, the printer of this invention is very useful in practical use.

In the foregoing description of the embodiment of this invention, the VBB capacity is changed by a setting signal inputted by a user from the front operation panel. However, various other constructions may occur to those skilled in the art, which make it possible to change the VBB capacity to an optimum value such as by using an instruction from the host computer or in accordance with a data density calculated by the CPU per se, thereby having a similar effect.

In addition, means for detecting overrun errors may be provided so that, when the detecting means detects occurrence of an overrun error, control means including a CPU recognizes the detection of occurrence of the overrun error and controls the VBB area controller 13 to broaden the current VBB area than its previous capacity, thereby setting a new broader VBB area by which the frequency of subsequent occurrence of overrun errors can be suppressed.

As described above, the printer of the present invention is constructed so that the text memory and the VBB are arranged within the same memory space and the capacity of the VBB within this memory space is made changeable. Accordingly, the total memory capacity of the text memory and the VBB can be made smaller as compared with the memory capacity of the prior art printer, and further the VBB area can be increased or decreased in accordance with a high or low value of the print density, thereby making it possible to suppress occurrence of overrun errors. Thus, the present invention can provide excellent practical advantages.

We claim:

1. A printer used as an output unit for a personal computer or the like comprising:

memory means having a first memory area for storing data including inputted letter codes and a second memory area for storing image data obtained by developing the data including the letter codes, said first memory area and said second memory area being arranged within one and the same memory space to form said memory means;

area control means for changing the capacity of said second memory area within said memory means to alter the relative proportions of said first memory area and said second memory area in said memory space forming said memory means; and print means for fetching the image data from said second memory area and performing printing in accordance with the fetched image data.

2. A printer according to claim 1, wherein said memory means comprises a random access memory (RAM).

3. A printer according to claim 1, wherein said area control means is constructed to be operated manually.

4. A printer used as an output unit for a personal computer or the like comprising:

an operation panel;

memory means having a first memory area for storing data including inputted letter codes and a second memory area for storing image data obtained by developing the data including the letter cods, said first memory area and said second memory area being arranged within one and the same memory space to form said memory means;

instructing means mounted on said operation panel of said printer for instructing said memory means to change the capacity of said second memory area within said memory means to alter the relative proportions of said first memory area and said second memory area in said memory space forming said memory means; and print means for fetching the image data from said second memory area and performing printing in accordance with the fetched image data.

5. A printer according to claim 4, wherein said instructing means comprises a central processing unit (CPU).

6. A printer according to claim 4, wherein said instructing means is operated by receiving a command signal from a host computer.

7. A printer according to claim 4, wherein said instructing means comprises detecting means for detecting occurrence of overrun errors during a printing operation and control means responsive to a detection output signal from said detecting means to increase the capacity of said second memory area within said memory means.

8. A printer according to claim 1, further comprising means for detecting an overrun error during a printing operation and generating a detection output signal indicating occurrence of said overrun error, and wherein said area control means changes said capacity of said second memory area in response to said detection output signal.

9. A printer according to claim 1, wherein said area control means changes said capacity of said second memory area in accordance with an input provided by a manual operator indicating a magnitude of a printing density of a document to be printed.

10. A printer according to claim 1, further comprising means for determining a data density of a document to be printed and wherein said area control means changes said capacity of said second memory area in accordance with said determined data density.

11. A printer according to claim 5, wherein said CPU determines a data density of a document to be printed and said instruction means instructs said memory means to change said capacity of said second memory area in accordance with said determined data density.

* * * * *